(12) United States Patent
Frens et al.

(10) Patent No.: US 10,664,921 B1
(45) Date of Patent: May 26, 2020

(54) HEALTHCARE PROVIDER BILL VALIDATION AND PAYMENT

(71) Applicant: Red-Card Payment Systems, LLC, St. Louis, MO (US)

(72) Inventors: Jeremy L. Frens, Maryland Heights, MO (US); Patrick J. Coughlin, St. Louis, MO (US); Peter J. Hinden, Chesterfield, MO (US); Daniel M. Battista, St. Louis, MO (US)

(73) Assignee: Red-Card Payment Systems, LLC, St. Louis, MO (US)

( * ) Notice: Subject to any disclaimer, the term of this patent is extended or adjusted under 35 U.S.C. 154(b) by 0 days.

(21) Appl. No.: 16/019,816

(22) Filed: Jun. 27, 2018

(51) Int. Cl.
| | |
|---|---|
| *G06Q 40/08* | (2012.01) |
| *G06Q 20/10* | (2012.01) |
| *G06K 9/00* | (2006.01) |
| *G06Q 20/40* | (2012.01) |
| *G06F 16/33* | (2019.01) |

(52) U.S. Cl.
CPC ............ *G06Q 40/08* (2013.01); *G06F 16/33* (2019.01); *G06K 9/00483* (2013.01); *G06Q 20/102* (2013.01); *G06Q 20/40* (2013.01)

(58) Field of Classification Search
USPC .......................................................... 705/4
See application file for complete search history.

(56) References Cited

U.S. PATENT DOCUMENTS

| | | | | |
|---|---|---|---|---|
| 2002/0007335 | A1* | 1/2002 | Millard ................. | G06Q 20/10 705/37 |
| 2002/0072927 | A1* | 6/2002 | Phelan .................. | G06Q 40/00 705/35 |
| 2003/0110163 | A1* | 6/2003 | Chen .................... | G06K 9/6203 |
| 2003/0225683 | A1* | 12/2003 | Hill ....................... | G06Q 10/06 705/37 |
| 2006/0095346 | A1* | 5/2006 | Gambhir .............. | G06Q 10/087 705/28 |
| 2006/0161463 | A1* | 7/2006 | Poonnen .............. | G06Q 10/10 705/4 |
| 2007/0162308 | A1* | 7/2007 | Peters .................. | G06F 19/328 705/2 |
| 2007/0192140 | A1* | 8/2007 | Gropper ............... | G16H 10/60 705/3 |
| 2008/0162305 | A1* | 7/2008 | Rousso ................ | G06Q 10/0631 705/26.5 |
| 2008/0281632 | A1* | 11/2008 | Poley ................... | G06Q 50/22 705/2 |
| 2009/0063197 | A1* | 3/2009 | Lisle .................... | G06F 19/328 705/4 |
| 2009/0112882 | A1* | 4/2009 | Maresh ................ | G06F 19/321 |

(Continued)

*Primary Examiner* — Edward Chang
*Assistant Examiner* — Slade E Smith
(74) *Attorney, Agent, or Firm* — Nicholas Pfeifer; Smith & Hopen, P.A.

(57) ABSTRACT

A system for validation of healthcare provider bills includes obtaining an image of the bill on a mobile device which uses optical character recognition to resolve the patient, provider and amount due as alphanumeric characters. This collection of data is cross-referenced against an explanation of benefits (EOB) generated by a third-party administrator which relays the portion of the healthcare provider bill covered by insurance versus what is the patient's responsibility. The EOB and provider bill are validated against each other so the patient can make payment in an accurate amount.

10 Claims, 11 Drawing Sheets

(56) References Cited

U.S. PATENT DOCUMENTS

| | | | |
|---|---|---|---|
| 2009/0138277 A1* | 5/2009 | Warren | G06F 19/328 705/2 |
| 2009/0204621 A1* | 8/2009 | Fagioli | G06Q 10/10 |
| 2010/0268304 A1* | 10/2010 | Matos | G16H 40/63 607/60 |
| 2010/0332251 A1* | 12/2010 | Yanak | G06Q 10/00 705/2 |
| 2011/0022418 A1* | 1/2011 | He | G09G 3/3648 705/4 |
| 2011/0071846 A1* | 3/2011 | Crystal | G06F 19/328 705/2 |
| 2011/0184843 A1* | 7/2011 | Orttung | G06Q 20/02 705/34 |
| 2011/0258004 A1* | 10/2011 | Dean | G06F 19/328 705/4 |
| 2012/0022887 A1* | 1/2012 | Chiappe | G06Q 30/04 705/2 |
| 2012/0041786 A1* | 2/2012 | Yu | G06Q 50/24 705/3 |
| 2012/0191471 A1* | 7/2012 | Logue | G06Q 20/14 705/2 |
| 2013/0110547 A1* | 5/2013 | Englund | G16H 10/60 705/3 |
| 2013/0159025 A1* | 6/2013 | Olaniyan | G06Q 40/08 705/4 |
| 2013/0246090 A1* | 9/2013 | Hoffman | G06F 19/328 705/2 |
| 2014/0006065 A1* | 1/2014 | Olaniyan | G06Q 40/08 705/4 |
| 2014/0100864 A1* | 4/2014 | Matosich | G06F 19/328 705/2 |
| 2014/0200909 A1* | 7/2014 | Felix | G06Q 50/22 705/2 |
| 2014/0371816 A1* | 12/2014 | Matos | A61N 1/3727 607/59 |
| 2015/0088709 A1* | 3/2015 | Mekala | G06Q 30/04 705/34 |
| 2015/0120338 A1* | 4/2015 | Dean | G06F 19/328 705/4 |
| 2016/0148317 A1* | 5/2016 | Benway | G06Q 40/08 705/2 |
| 2016/0217488 A1* | 7/2016 | Ward | G06Q 10/10 |
| 2016/0267484 A1* | 9/2016 | Smoley | G06Q 20/4016 |
| 2017/0221066 A1* | 8/2017 | Ledford | G06Q 20/4037 |
| 2017/0351824 A1* | 12/2017 | DeGasperis | G06Q 20/382 |
| 2018/0181716 A1* | 6/2018 | Mander | G16H 40/20 |
| 2018/0181964 A1* | 6/2018 | Zagarese | G06Q 20/40145 |
| 2018/0211724 A1* | 7/2018 | Wang | G16H 40/20 |

* cited by examiner

HEALTHCARE PROVIDER BILL VALIDATION AND PAYMENT

BACKGROUND OF THE INVENTION

1. Field of the Invention

This invention relates to healthcare billing. More specifically, it relates to facilitating insured patient payments to healthcare providers wherein a portion, or all of the costs need to be paid by the patient.

2. Brief Description of the Art

An insured patient receives a healthcare provider's bill in the mail that requires payment of $100 for some services that the provider rendered a month earlier. However, at least part of the visit was presumably covered by insurance. The insurance company receives a request for payment from the provider and the claim is adjudicated by the insurance company to determine what is covered by insurance versus what is the patient's responsibility. The report generated is called an explanation of benefits (EOB).

The problem is if the provider's bill (or "provider statement") arrives before the EOB, the patient has few options to know they are paying the correct amount. Often the patient simply discards the doctor's bill until the EOB arrives and then waits for another round of billing from the doctor's office. Once the patient does have the EOB, he or she must make certain that the EOB is the correct one, verifying a match between doctor, patient, date and services.

Even if the EOB is the correct one, the patient must decipher the EOB amounts and match that against the amount the provider requested. If the patient cannot figure out how the amounts match, the patient might: (1) call the insurance company to discuss; (2) call the provider's office to discuss; (3) ignore the bill and see if another one comes in; (4) pay an amount believed to be correct; and/or (5) pay the bill then find out the insurance company also paid it thereby requiring the patient to seek reimbursement back from the provider.

Many factors lead to confusion and mismanagement of payments. EOBs are often sent 2-4 weeks before the provider bills are received, or 2-4 weeks after, depending upon the insurance company. Therefore, they are out of synchronization. EOBs are often sent only once per month and grouped by patient. Therefore, finding the claims on an EOB that the provider is billing for is not trivial. EOBs further contain substantial amounts of information unrelated to the provider bill. The amount a provider requests to be paid is never known by the patient until the provider bill is compared to the EOB.

What is needed in the art is a system to synchronize and collate the EOB and the provider bill so the patient understands what to pay and has confidence he or she is paying the correct amount. However, in view of the art considered as a whole at the time the present invention was made, it was not obvious to those of ordinary skill in the field of this invention how the shortcomings of the prior art could be overcome.

BRIEF SUMMARY OF THE INVENTION

In an embodiment of the invention, a mobile device such as a smart phone is communicatively coupled to a remote network (typically the Internet through WIFI or cellular connections such as 3G or 4G). The remote network would generally connect the mobile device to an application server hosted in a cloud computing platform or on-premise server. The mobile device has a processor, optical camera, memory and software that executes instructions to carry out the invention. The instructions take the form of a mobile app which is downloaded to the mobile device. A user of the mobile app stores his identity accessible through the mobile app. This may include his email address, a login username, password, healthcare member ID, payment information, and/or third-party authentication APIs (such as those available under the brands GOOGLE IDENTITY PLATFORM and FACEBOOK LOGIN).

A user of the mobile device receives a healthcare provider bill and obtains a photographic image of the bill. This may be done from within the mobile app provided the mobile app has been granted access to the device's camera. Alternatively, a preexisting image in the image library of the mobile device may be selected from within the mobile app for processing. The image of the provider bill is sent to an OCR-processing engine. This may be done locally on the device using a software development kit (SDK) such as that sold under the brand ABBYY MOBILE OCR ENGINE and offered by ABBYY Software Ltd. out of Nicosia, Cyprus. Alternatively, the image may be transmitted to a remote OCR processing engine which resolves the alphanumeric characters and the context in which they appear on the bill. Yet another embodiment permits the end user to upload a digital file of the bill wherein the alphanumeric characters are readable by the software application directly (e.g., without OCR). The most common file format in this case is the Postscript Document Format (PDF) standard managed by Adobe Systems, Inc. Some of the fields read directly or resolved by OCR include: provider name; remit-to address; patient name; amount due; and patient account number. Service line data may also be read including: dates of service; charge amounts; adjustments; CPT codes; service descriptions; insurance payment amount; and copay amounts.

When the healthcare provider initially serviced the patient, they sent a bill to an insurance carrier less any patient co-pay made at the time. The insurance company adjudicates the claim and determines what is covered by the insurance policy and what the patient must pay out-of-pocket. This information is reported in an explanation of benefits (EOB) which is stored in an EOB database. EOB data and text data from the provider bill is then compared by a string comparison function (herein "Red Card Engine") which looks to match fields such as the provider name, remit-to address, amount due, patient name, patient account number, service line data and the like. If an EOB is linked to the provider bill then the amounts can be reconciled and determined if accurate and should be paid. An important utility of this invention is the temporal synchronization of both the EOB and patient bill. Typically, this information is received by the patient in a staggered fashion and the patient is unsure whether to pay what the provider is requesting or not.

In the event a match cannot be immediately made, the name, address and other identifying information of the provider may be used to query "near matches" which can then be presented to the user on the mobile device to confirm which healthcare provider was seen. Yet another embodiment of the invention geolocates the patient while they are at the provider's office during the visit for which the bill is later generated. This provides both location data and a date/timestamp for the visit itself. This information is stored and later retrieved to match the correct EOB to the provider bill. The mobile app may run in the background and periodically poll location data to determine whether the device is at a location where healthcare service is provided. The user may also open the mobile app and simply confirm manually the location they are in.

The mobile app may also store or access a plurality of payment methods which can be authorized to pay the healthcare provider directly from the mobile app. The patient may pay in full by one payment means, pay a portion of the bill, spread payments over time, and/or use multiple payment means to pay all or a portion of a provider bill. Payment means may include ACH draws on a bank account, payment cards, health savings accounts (HSA), flexible spending account (FSA) and the like. In the event of a discrepancy between the amount billed by the provider as "patient responsibility" and that noted by the EOB as "patient responsibility" the mobile app may present both amounts and let the user pay either one. An advantage of this method is that the patient may pay the "lesser amount not in dispute" so the healthcare provider at least gets a substantial portion of the amount billed while both parties sort out any mistakes in the billing process. This is superior to forcing a stalemate wherein the patient cannot easily execute a payment when the amounts do not align. By reducing the user interaction with the mobile app user interface (e.g., presenting anticipated payment solutions for authorization), friction is reduced in the payment process. Healthcare providers are paid faster and patients have greater certainty and confidence in the billing process.

Yet another feature of the present invention is tracking costs for treatments and procedures. Current Procedural Terminology (CPT) is a medical code set that is used to report medical, surgical, and diagnostic procedures and services to entities such as physicians, health insurance companies and accreditation organizations. CPT codes are made up of five characters. These characters are numeric and alphanumeric depending on which category the CPT code falls in. CPT codes are submitted by the healthcare provider to the insurance carrier for payment. The CPT codes are matched to fee schedules by the insurance companies to determine how much of the healthcare provider's bill is covered under a given insurance policy. The remainder is the responsibility of the patient. Because the present invention has access to thousands of EOBs and provider statements, it is possible for the mobile device to present statistical data on the average cost for a given CPT code including what the average patient responsibility is. This may prove useful for the patient if the procedure cost substantially deviates over the averages for a given area. Alternatively, the average cost for a CPT code may help the healthcare provider substantiate the billing and assure the patient that the costs are in line with what other patients experience.

Another feature of the present invention is aggregating a history of the procedures for a given healthcare provider along with historical billing. Access to this and other records on the mobile app may be shared with family members and authorized healthcare providers. The mobile app may also query for provider ratings including billing, effectiveness, timeliness and the like.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
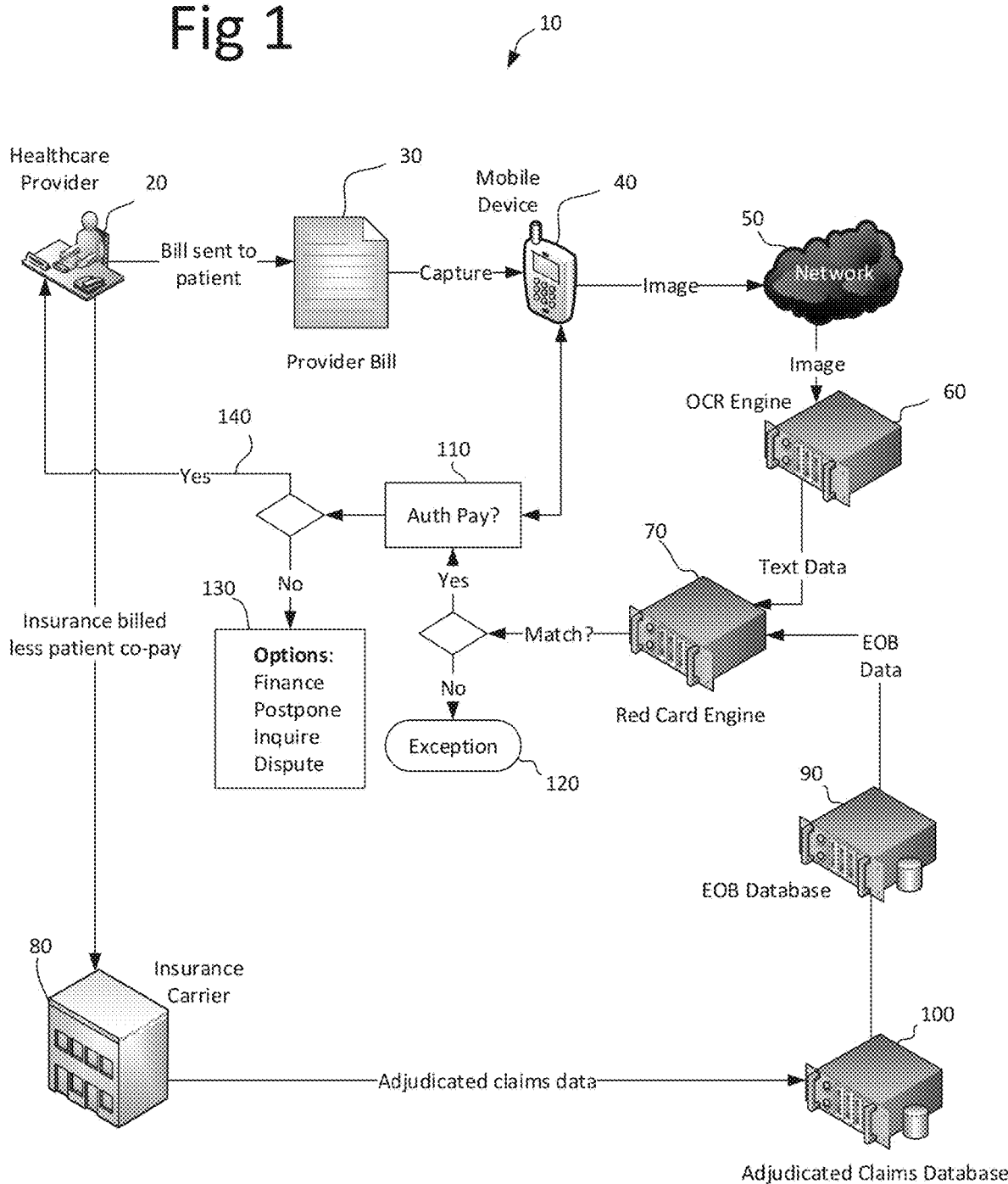
FIG. 1 is a diagrammatic view of an embodiment of the invention using remote OCR.

The novel invention is denoted as a whole in FIG. 1 by the reference numeral 10. Healthcare provider 20 treats patient and sends a bill to insurance. The term "insurance" includes insurance companies, health maintenance organizations (HMOs), preferred provider organizations (PPOs), third party administrators (TPAs) or government agencies such as Medicare, Medicaid, etc. The claim is typically in an EDI 837 transaction set which was established to meet HIPAA requirements for the electronic submission of healthcare claim information. The claim information includes: a description of the patient; the patient's condition for which treatment was provided; the services provided; date of service; and the cost of the treatment.

The claim is received by insurance company 80 who adjudicates the claim and generates adjudicated claims data which is stored in adjudicated claims database 100. Adjudicated claims data in adjudicated claims database 100 is used to construct EOB database 90. The EOB data is used primarily by Healthcare insurance plans to make payments to healthcare providers, to provide Explanations of Benefits (EOBs) to healthcare patients and providers, or both, and also to keep track of a patient's health history. When a healthcare service provider submits an 837 Health Care Claim, the insurance plan creates EOB data to detail the payment to that claim, including: what charges were paid, reduced or denied; whether there was a deductible, co-insurance, co-pay, etc.; any bundling or splitting of claims or line items; and how the payment was made, such as through a clearinghouse. A particular EOB data set may not always align one-for-one with a specific 837. It is not unusual for multiple EOB data transactions to be used in response to a single 837, or for one EOB data file to address multiple 837 submissions. Accordingly, the EOB data is important to healthcare providers, to track what payments were received for services they provided and billed.

Sometime later, healthcare provider 20 sends provider bill 30 to the patient. Using mobile device 40, patient captures an image of provider bill 30 which is transmitted over network 50 (e.g., Internet) to OCR engine 60. OCR engine 60 converts the image into text data which is then received by Red Card Engine 70. Some of the fields converted to text by OCR from the provider bill include: provider name; remit-to address; patient name; amount due; patient account number; dates of service; charge amounts; adjustments; CPT codes; service descriptions; insurance payment amount and copay amounts. Red Card Engine 70 is a server running string-handling routines to match up EOB data received from EOB database 90 with the text data received from OCR Engine 60. The most common fields for comparison include: provider name; remit-to address; amount due; patient name; and/or patient account number.

When the EOB and provider bill are matched they are presented concurrently to the patient on the mobile device 40. These two separate but related files convey to the patient their financial responsibilities with an enhanced level of validity. Because the provider bill and EOB were previously received out of sequence, it was difficult for a patient to confidently make timely payment on the patient responsibility of the provider bill. When matched, the patient authorizes payment 110 through mobile device 40 which sends funds 140 to healthcare provider 20. Alternatively, patient may not authorize payment in which mobile device 40 presents additional options 130 including: financing the provider bill; postponing payment on the bill; inquiring from either the insurance carrier or provider about the bill; and/or disputing the bill. Alternatively, the patient may pay the bill separately, outside of the app.

Figure 4:
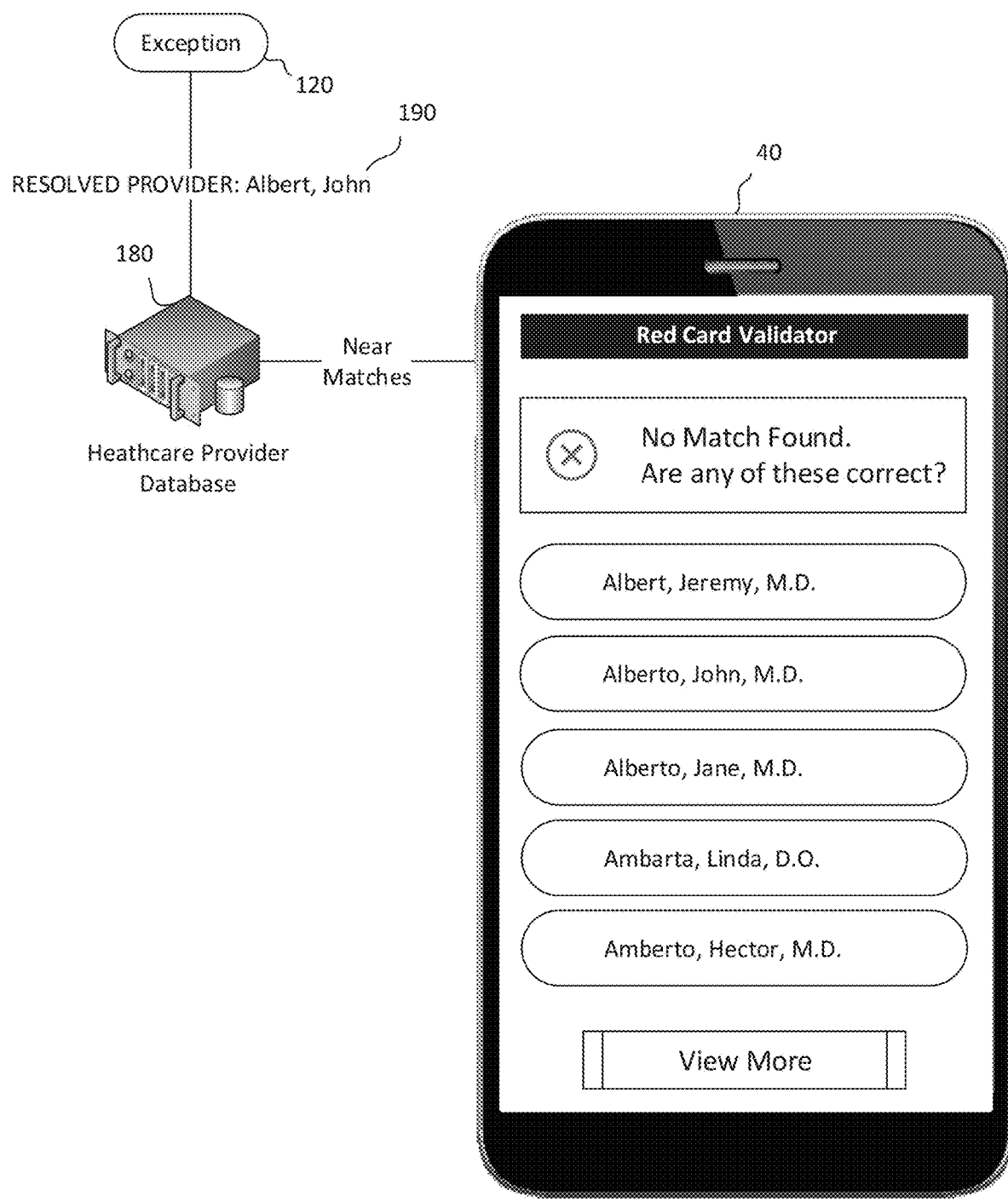
FIG. 4 is a partially diagrammatic, partial GUI showing an exception handling procedure according to an embodiment of the invention.

In the event a match is not made between EOB and text data from provider bill 30, an exception 120 is thrown. Additional querying may take place including comparing more fields between provider bill 30 and EOB data. Such additional fields may include service line data such as: dates of service; charge amounts; adjustments; CPT codes; service descriptions; insurance payment amount; and copay amounts. If a match can still not be found, then near matches may be presented to the mobile device 40 user. Such a process is shown in FIG. 4 wherein the resolved provider string 190 was "Albert, John." This string is processed against healthcare provider database 180 which produces near matches and displays them on mobile device 40. End user to mobile device 40 may simply select with a single touch the correct provider.

Figure 5:
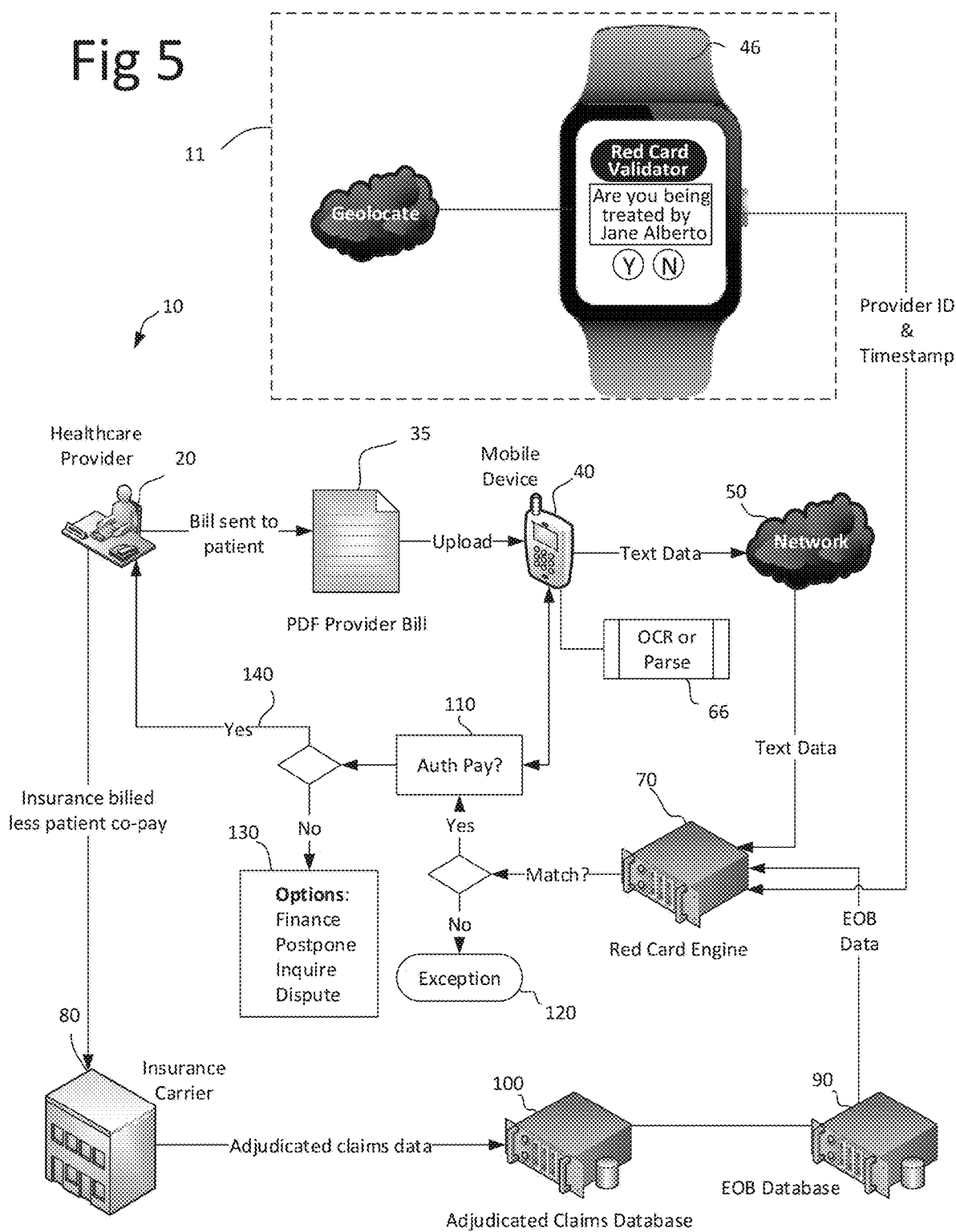
FIG. 5 is a partially diagrammatic, partial GUI showing geolocation used to help match a provider bill to an EOB according to an embodiment of the invention.

Yet another embodiment of the invention polls the location of the mobile device user when they originally visited healthcare provider 20. This is illustrated in FIG. 5 with a smartwatch 46 embodiment of the mobile application which geolocates 11 the end user during the visit to the provider. The geolocation process 11 may comprise a plurality of geo-fenced providers so that merely arriving at the location of the provider triggers a log to be generated with the provider identity and timestamp. The trigger may be upon arrival or could include a set threshold requiring the end user to be within the geo-fence for a predetermined period of time. This helps avoid false-positives in the event the end user is simply passing through various medical practices on their way to healthcare provider 20. The provider ID and timestamp are used by Red Card Engine 70 to match the provider bill 30 and EOB data.

Figure 2:
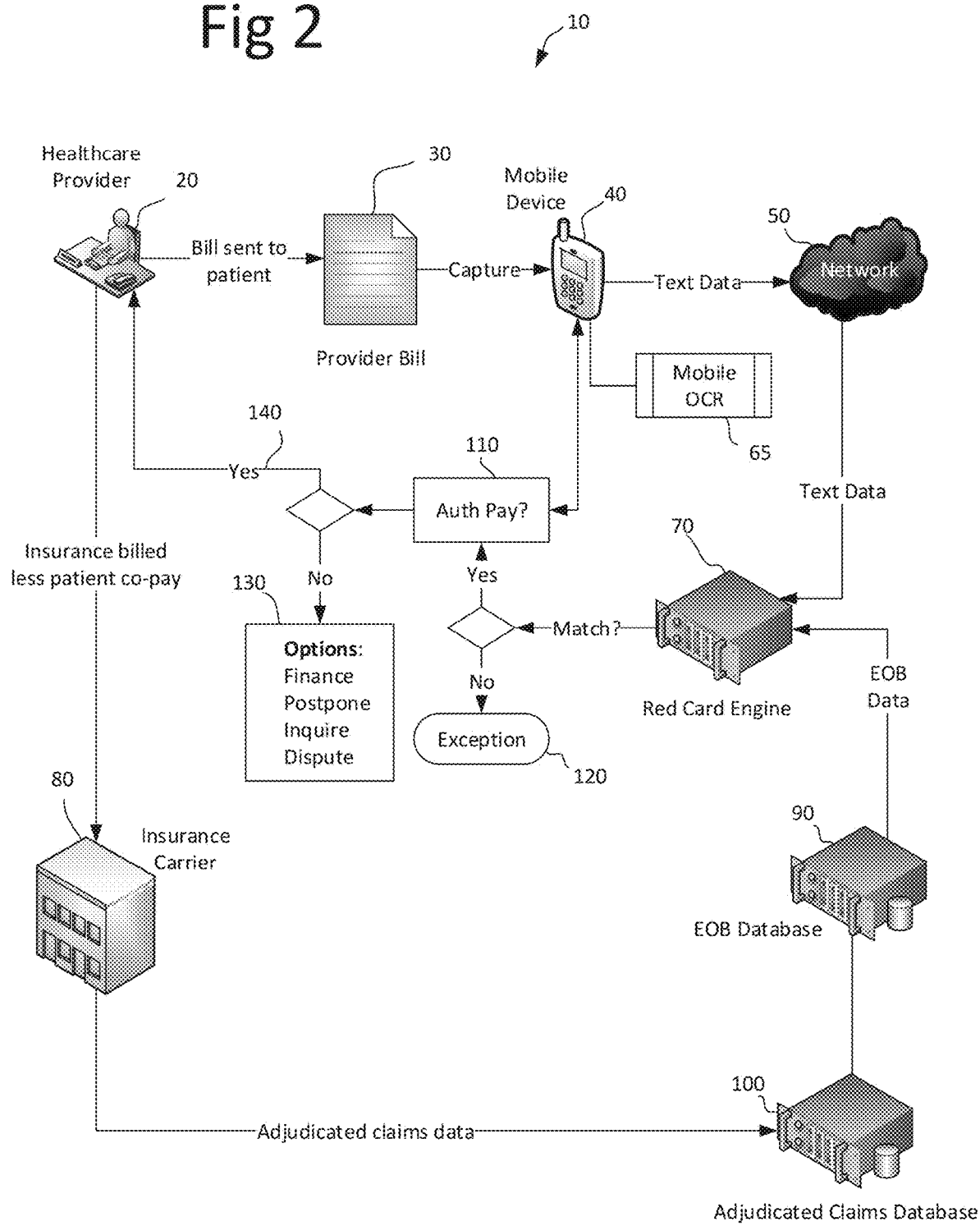
FIG. 2 is a diagrammatic view of an embodiment of the invention using local OCR on the mobile device.

FIG. 2 shows an alternative embodiment of the invention wherein a mobile OCR SDK 65 is integrated into the mobile app running on mobile device 40 so that the image-to-text processing of provider bill 30 occurs locally instead of remotely. Accordingly, text data is passed through network 50 and then directly to Red Card Engine 70 for matching with EOB data from adjudicated claims database 100.

Figure 3:
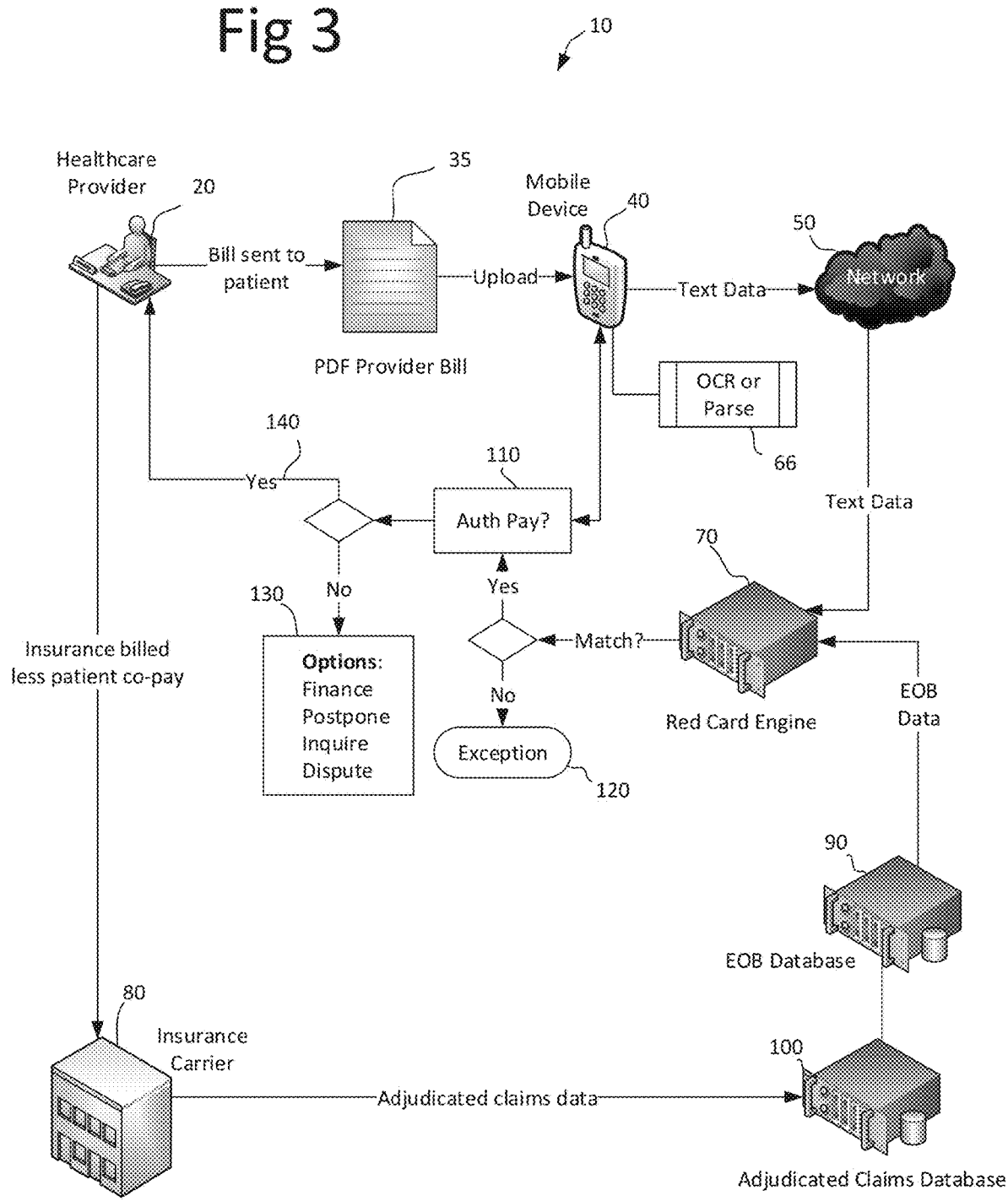
FIG. 3 is a diagrammatic view of an embodiment of the invention wherein the provider bill is uploaded rather than imaged.

In yet another embodiment of the invention shown in FIG. 3, no OCR is required as provider bill 35 is a digital file wherein the text encapsulated within is directly readable without any OCR process. The most common format for such digital documents is the PDF standard.

Figure 6:
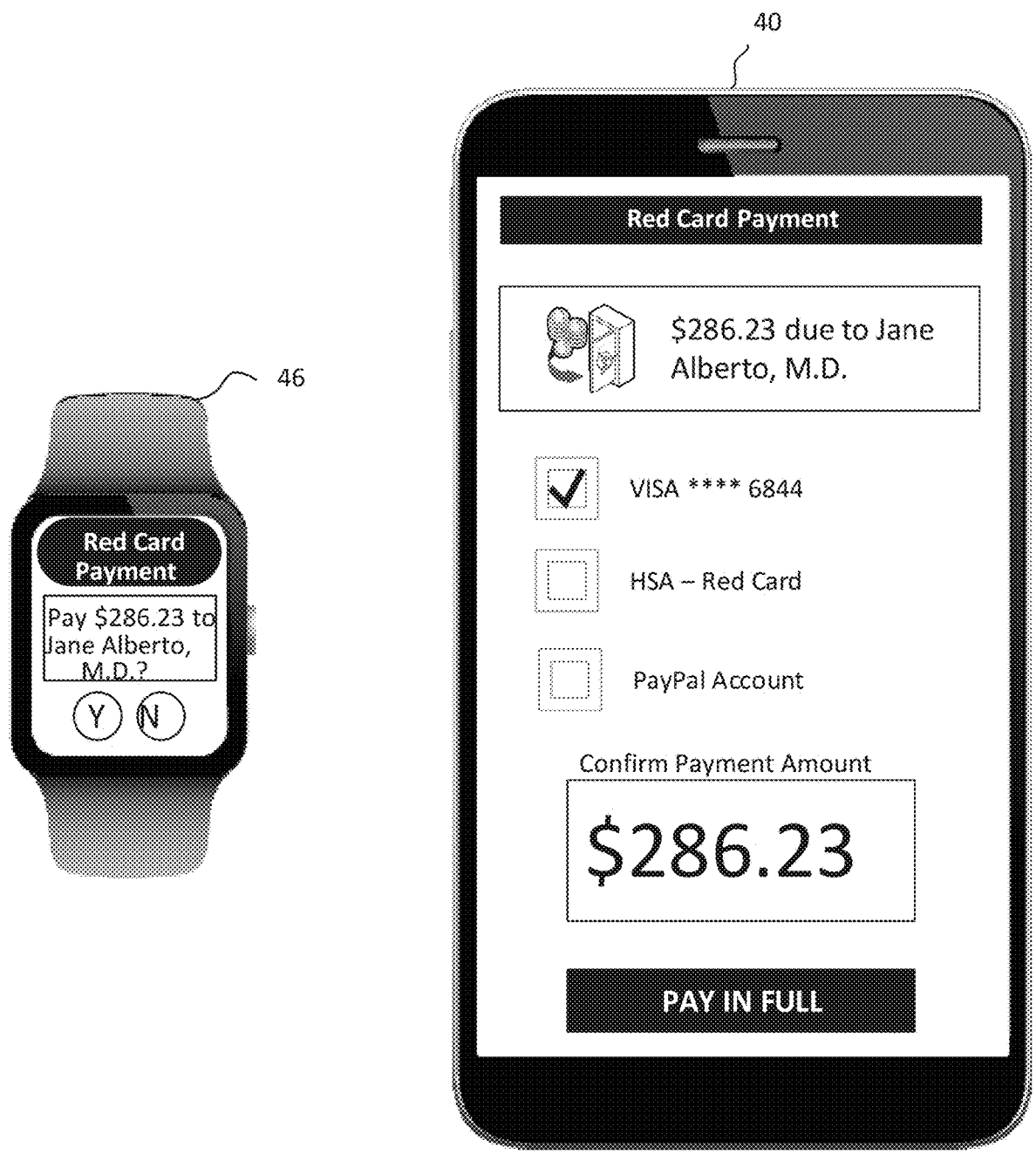
FIG. 6 shows two device GUIs for making payment on a provider bill according to an embodiment of the invention.
Figure 7:
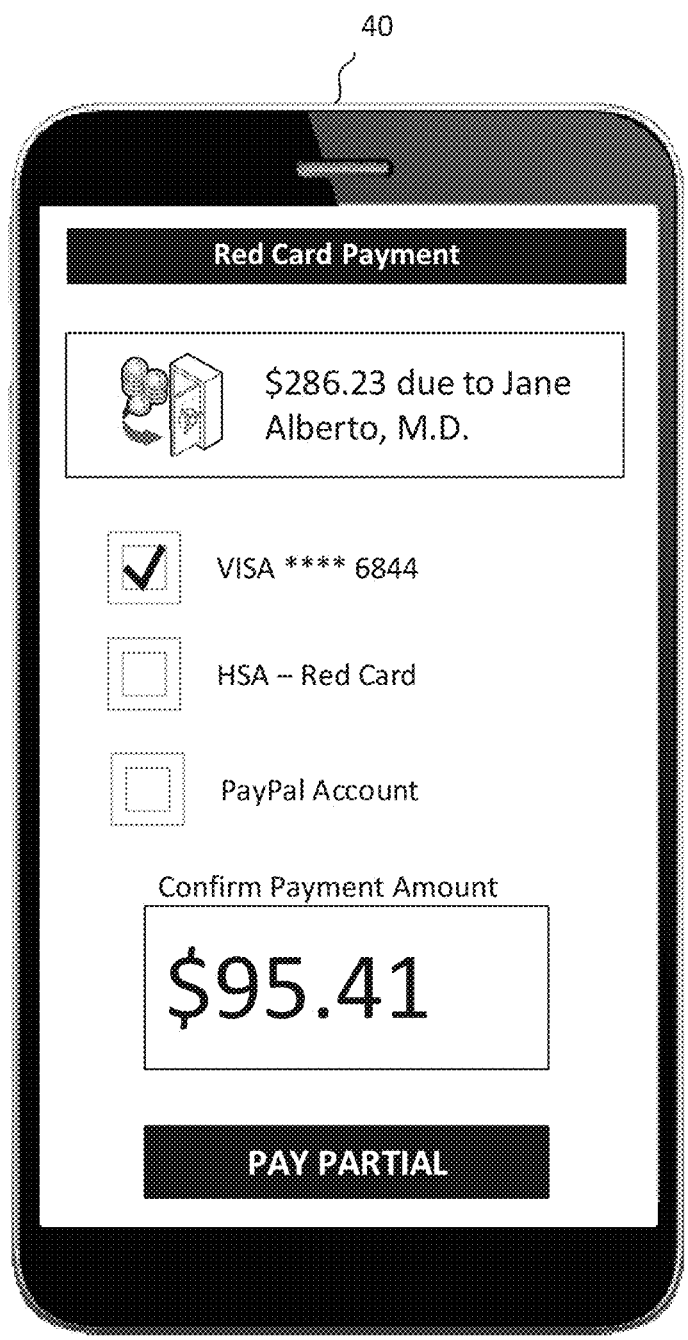
FIG. 7 shows a device GUI enabling partial payment according to an embodiment of the invention.
Figure 8:
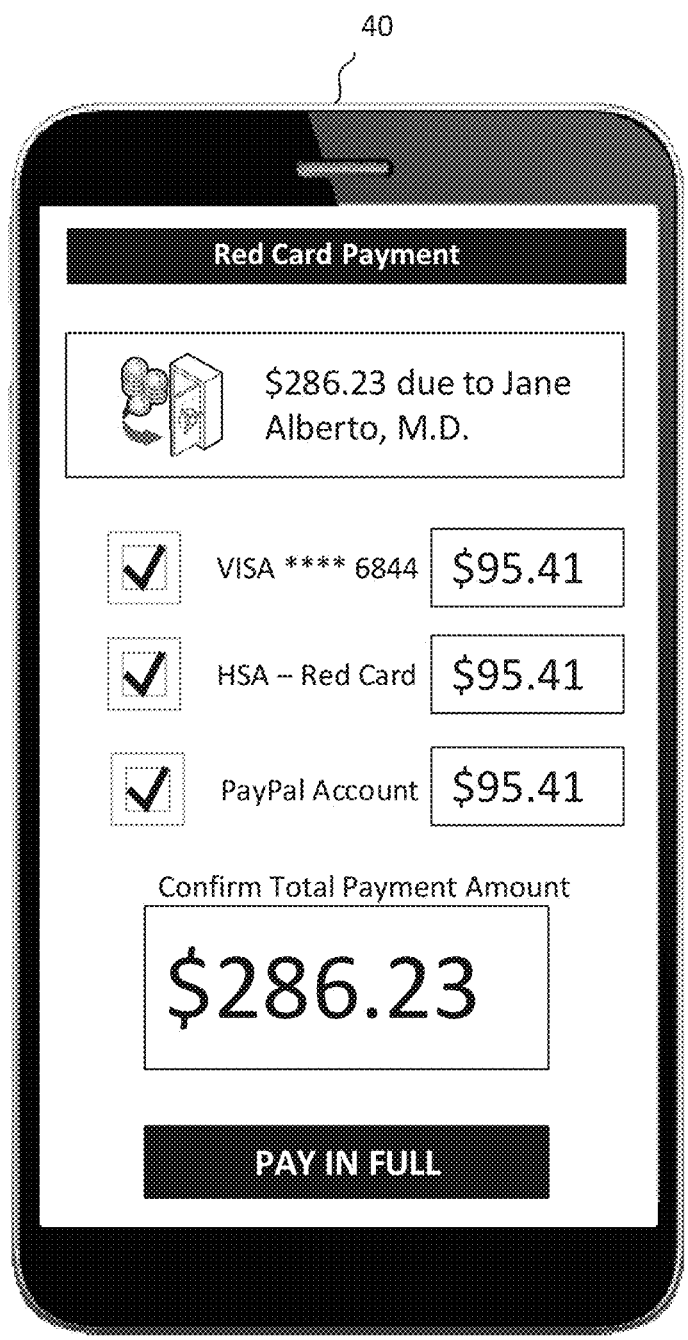
FIG. 8 shows a device GUI enabling payment from multiple sources according to an embodiment of the invention.

In FIG. 6, a plurality of payment methods are stored in the mobile device 40 app including a VISA payment card, an HSA savings account and a PAYPAL account. A companion smartwatch app 46 also displays a payment authorization UI. The end user may select the healthcare provider name to open up another screen with additional details about the billing and EOB information. The end user may specify the exact amount to be paid but generally the payment textbox control will populate with the default amount in agreement between the provider bill and the EOB. FIG. 7 shows payment of a portion of the full amount to the healthcare provider. FIG. 8 shows payment in full but split between three different payment sources. Because the mobile app already has access to the healthcare provider information and patient information, collateral fields may be included with the electronic payment to help the healthcare provider reconcile partial payments to the patient's account.

Figure 9:
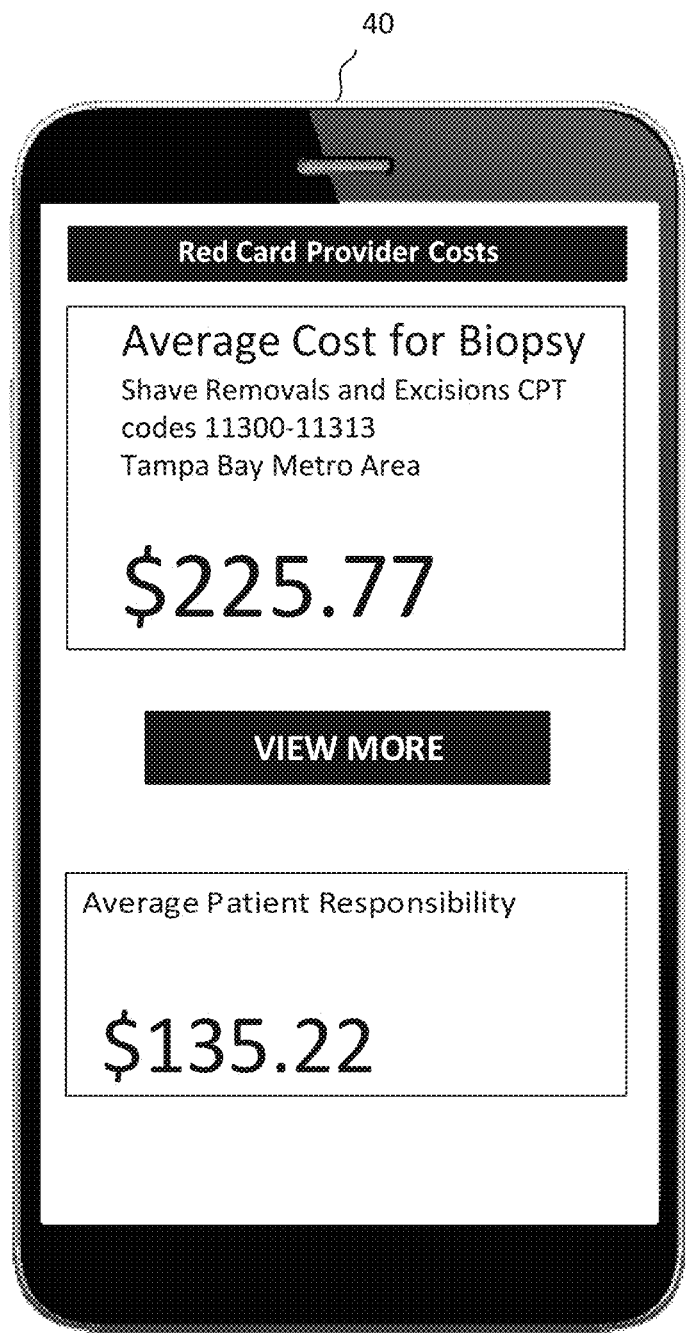
FIG. 9 shows a device GUI displaying an average cost for a known medical procedure according to an embodiment of the invention.

FIG. 9 shows the average cost for a biopsy under CPT codes 11300-11313 for the Tampa Bay metro area. This information is aggregated by processing a plurality of healthcare provider bills and EOBs. The mobile app user is able to access these statistics which better inform the patient on medical costs. The information will also assist the patient in detecting patient responsibilities that are unusually excessive and may reflect an unintentional error in billing by the healthcare provider.

Figure 10:
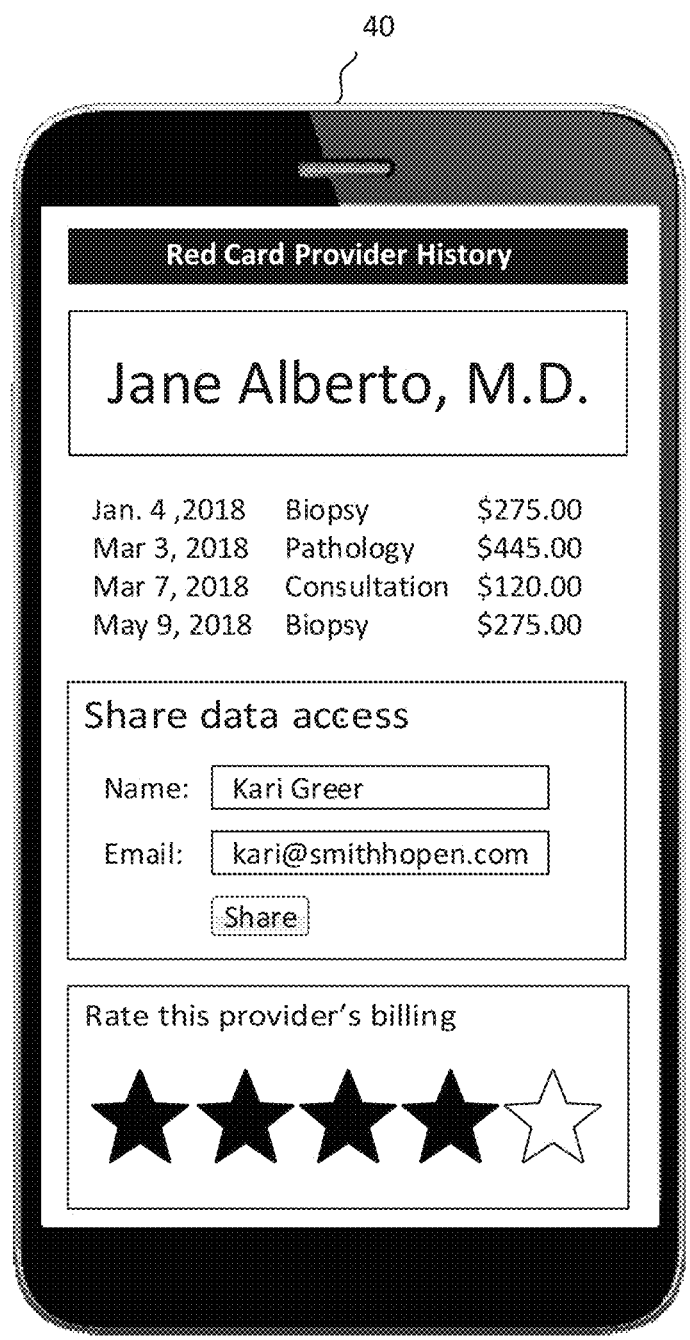
FIG. 10 shows a device GUI display a patient history for a healthcare provider, an interface for sharing access and a rating control according to an embodiment of the invention.

FIG. 10 shows a UI on the mobile app with a number of features. The first is a billing and procedure history for a particular healthcare provider. Should the mobile app user pay through the mobile app, certain bills may be marked "paid" on the UI. The listing may be interactive wherein selecting a line item opens up additional detail about the procedure, billing and EOB information aggregated together according to the invention. Yet another feature shown in FIG. 10 is a control for sharing medical record access to a third party. This may be a friend, family member or additional healthcare provider. The end user inputs at least an email address for the person to which access will be granted. An email is generated with a temporary unique GUID link to a secure account setup interface for the third party to establish access to the patient information. The access may be modified, renewed or revoked by the mobile app user as desired. The mobile app user may also receive notifications when the third party has accessed their records including geolocation data from the IP address used to access the system. For security, access may be denied if a third party attempts to access the data from outside a geo-fence (e.g., a city, state, country or the like). Finally, the mobile app user may rate the healthcare provider experience (in this example, giving four of five stars). Additional metrics may be queried beyond "provider billing" such as wait times, scheduling, attentiveness and other aspects of medical interaction.

Figure 11:
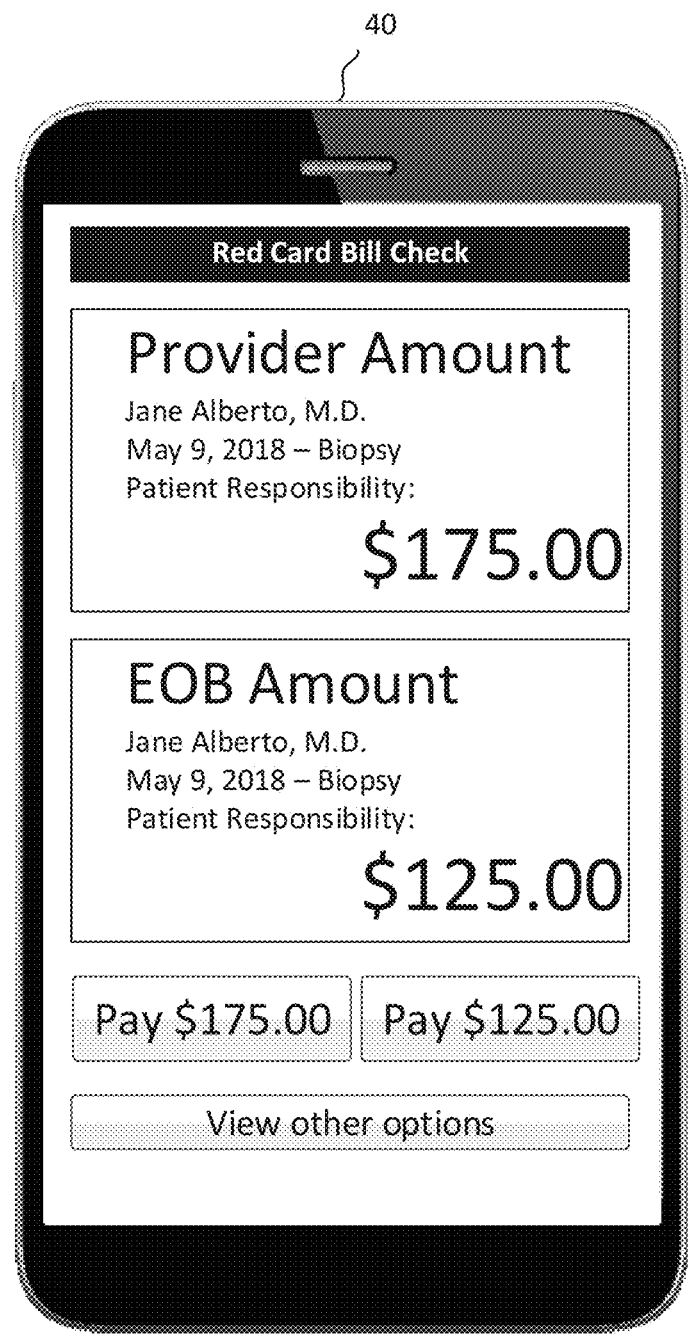
FIG. 11 shows a device GUI display of a discrepancy between a healthcare provider amount due and an EOB-calculated amount due according to an embodiment of the invention.

FIG. 11 shows a $50 difference between a healthcare provider amount due and an EOB-calculated amount. The mobile app automatically creates a first control to authorize payment of the provider amount and a second control to authorize payment of the EOB amount. This provides an option for the healthcare provider to receive payment immediately for an amount not in dispute. It is possible that the greater provider amount is correct. However, a patient is unlikely to voluntarily pay the greater amount without some additional justification. The mobile app may automatically add to a memo line in the electronic payment to the healthcare provider that this partial amount was calculated from the EOB.

An advantage of the invention is not just the payment facilitation, but the reasons behind the payment. Because the system has data from both the provider bill and EOB it can relay that along with the payment information to the provider in a string field (e.g., the memo field on an electronically created paper check or a text string field in an electronic payment). For example, the memo field may read "EOB shows $125 pat. respon." Another example would read "partial payment, patient requests add 30 days." By conveying the terms of the payment in a clear and consistent manner, the healthcare provider accounts receivables department may better apply payments and even make adjustments and corrections in follow-up billing. The mobile app may facilitate conveying this information by pre-populating the payment instructions using the EOB and provider billing data and generating selectable controls that minimize interaction with the UI. For example, instead of requiring the user to type in the payment amount the mobile app UI fills in the text box field with the recommended payment amount. If the mobile app gives the end user payment choices in amount, a plurality of controls with descriptive labels may be generated so that executing one of those options is simply a selection and confirmation. The mobile app takes care of the rest of the process.

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

Application means a computer software application executing on a remote or local computer device which may include a workstation, smartphone, tablet, thin client or the like.

End User means a computer user operating a computer software application.

End user does not mean a developer typically having write access to the source code of the application.

Executable instructions means procedures and functions called by computer software.

Explanation of Benefits (EOB) means a statement sent by a health insurance company to covered individuals explaining what medical treatments and/or services were paid for on their behalf.

Geolocation means the identification or estimation of the real-world geographic location of a computer user by associating a geographic location with the Internet Protocol (IP) address, MAC address, RFID, hardware embedded article/production number, embedded software number (such as UUID, Exif/IPTC/XMP or modern steganography), Wi-Fi positioning system, or device GPS coordinates.

Healthcare Provider means a doctor of medicine or osteopathy, podiatrist, dentist, chiropractor, clinical psychologist, optometrist, nurse practitioner, nurse-midwife, or a clinical social worker who is authorized to practice by a governing regulatory body. For the purposes of this invention, healthcare provider also includes hospitals, clinics, outpatient facilities, prosthetics, medical suppliers and similar entities that send bills for healthcare-related expenses that may be covered by insurance.

Image means a digital picture represented in raster or vector format. Common raster formats include JPG, TIFF, PNG and BMP. Common vector formats include SVG, EPS and AI.

Insurance means includes insurance companies, health maintenance organizations (HMOs), preferred provider organizations (PPOs), or government agencies such as Medicare, Medicaid, or the like.

Memory array means memory accessible by a computing device which stores and loads an operating system and software applications.

Mobile device means a portable computing device such as a smartphone, tablet and notebooks computer, typically handheld and communicatively coupled to a global computer network through WIFI and/or cellular connections.

Optical camera means a camera that captures photographs in digital memory using a CCD or CMOS.

Optical character recognition (OCR) means recognition of printed or written text characters by a computer. This involves photo-scanning of the text character-by-character, analysis of the scanned-in image, and then translation of the character image into character codes, such as ASCII, commonly used in data processing. OCR also includes processing and identification of the document layout both for the context of the character strings processed therein and as a means to identify the origin of the document.

Patient identity means the unique identity of the patient which may be resolved by social security number, name, date of birth, address, email address or the like.

Processor means an electronic circuit which performs operations on some external data source, usually memory or some other data stream.

Provider identity means the unique identity of the healthcare provider which may be represented by tax identification number, practice name, street address or the like.

Software module means a software application or collection of software applications located on one or more computer processing platforms to perform a function or procedure.

User identity means a unique value for an end user operating a mobile device. This may be a primary key value such as an integer, GUID, email address, user name string or the like.

Validation means checking the accuracy or acceptability of the healthcare provider bill reconciled to the EOB data. This may be a Boolean value requiring an exact match, a fixed threshold value, or a variable threshold value. By way of example, validation may be satisfied by a reconciliation within $10, within 5% or may contain user or application-defined logic such as requiring exact amounts over $1,000 or by type of procedure or medical expense.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method for validating an unpaid bill to determine an amount a patient is required to pay a healthcare provider for rendered healthcare services, the method comprising:
    storing identity data of the patient;
    responsive to a patient's mobile device entering a location corresponding to an address of a healthcare provider, identifying, by the patient's mobile device, a first timestamp value and a first geolocation value in real-time;
    storing, in a digital data store, the first timestamp value and the first geolocation value;
    receiving a first digital image taken with a digital camera and digitally sent from the patient's mobile device, the first digital image comprising the unpaid bill;
    converting the first digital image to a digital dataset of alphanumeric characters, by an OCR-processing engine, wherein the digital dataset comprises the address of the healthcare provider, a time value associated with the rendered healthcare services, and an amount due;
    automatically validating the unpaid bill by comparing the address of the healthcare provider stated on the unpaid bill against the first geolocation value stored in the digital data store, and comparing the time value associated with the rendered healthcare services listed on the unpaid bill against the first timestamp stored in the digital data store;
    automatically remotely accessing an adjudicated claim database having digital EOB data and matching the digital dataset to the digital EOB data for the unpaid bill;
    automatically validating the amount due listed on the unpaid bill by comparing the amount due listed on the unpaid bill against an amount that the patient must pay out-of-pocket provided in the EOB data; and
    displaying, to the patient on the patient's mobile device, validation results corresponding to validating the address of the healthcare provider, the time value associated with the rendered healthcare services, and the amount due listed on the unpaid bill.

2. The method of claim 1, further comprising transmitting the first image from the patient's mobile device to a remote OCR-processing engine.

3. The method of claim 1, wherein the OCR-processing engine executes on the patient's mobile device.

4. The method of claim 1, further comprising presenting one or more near matches of the healthcare provider identity to the patient responsive to failure to obtain an exact match between the unpaid bill and EOB data wherein the one or more near matches are displayed on the mobile device as selectable controls for the patient to choose.

5. The method of claim 1, further comprising securely storing on the patient's mobile device a payment option from which a healthcare provider bill validated against matched EOB data may be at least partially paid.

6. The method of claim 1, further comprising securely storing on the patient's mobile device a plurality of payment options from which a healthcare provider bill validated against matched EOB data may be paid.

7. The method of claim 1, further comprising displaying on the patient's mobile device a comparison of the amount of the unpaid bill that the patient is required to pay as calculated by the healthcare provider and the amount of the unpaid bill that the patient is required to pay as reported by EOB data.

8. The method of claim 7, further comprising displaying a selectable control to pick whether to pay the amount of the unpaid bill as calculated by the healthcare provider or the amount of the unpaid bill that the patient is required to pay as reported by EOB data.

9. A system for validating an unpaid bill needing to be covered at least partially by a patient for services rendered healthcare services, the system comprising:
- a software module installable on a mobile device communicatively coupled to a remote network, the device including a processor, and a memory array, the software module stored in the memory array; the software module further comprising executable instructions that when executed by the processor cause the processor to:
- store the patient's identity data;
- responsive to a patient's mobile device entering a location corresponding to an address of a healthcare provider, identify, by the patient's mobile device, a first timestamp value and a first geolocation value in real-time;
- store the first timestamp value and the first geolocation values in a digital data store;
- receive a first digital file from the patient received by the device, the first digital file comprising the bill;
- send the first file to a string-processing engine wherein at least a portion of the first file is resolved to alphanumeric characters comprising a data set including a healthcare provider identity, the address of the healthcare provider, a time value associated with the rendered healthcare services and an amount due;
- automatically validate the unpaid bill by comparing the address of the healthcare provider stated on the unpaid bill against the first geolocation value stored in the digital data store, and comparing the time value associated with the rendered healthcare services listed on the unpaid bill against the first timestamp stored in the digital data store;
- match the dataset to digital EOB data from an adjudicated claim database for the unpaid bill;
- automatically validate an amount that the patient must pay out-of-pocket by comparing the amount due on the unpaid bill in relationship to the digital EOB data; and
- display, to the patient on the patient's mobile device, validation results corresponding to validating the address of the healthcare provider, the time value associated with the rendered healthcare services, and the amount due listed on the unpaid bill.

10. The system of claim 9 wherein the first digital file is image data converted to alphanumeric characters by OCR.

* * * * *